LAMINATED VORTEX AMPLIFIER WITH A PICKOFF FORMED IN ONE LAMINA

Filed Feb. 15, 1968

INVENTOR
ROBERT S. KIWAK

BY

James L. O'Brien
ATTORNEY

Feb. 10, 1970 R. S. KIWAK 3,494,372

LAMINATED VORTEX AMPLIFIER WITH A PICKOFF FORMED IN ONE LAMINA

Filed Feb. 15, 1968

INVENTOR
ROBERT S. KIWAK

BY

James L. O'Brien
ATTORNEY

United States Patent Office 3,494,372
Patented Feb. 10, 1970

3,494,372
LAMINATED VORTEX AMPLIFIER WITH A PICKOFF FORMED IN ONE LAMINA

Robert S. Kiwak, Dearborn Heights, Mich., assignor to The Bendix Corporation, a corporation of Delaware Filed Feb. 15, 1968, Ser. No. 705,779
Int. Cl. F15c *1/08*
U.S. Cl. 137—81.5 4 Claims

ABSTRACT OF THE DISCLOSURE

A laminated vortex amplifier in which the pickoff is formed by a lamina provided with an orifice.

BACKGROUND OF THE INVENTION

The basic objective in most vortex fluid amplifiers is to provide a readily manufacturable structure in which the output pressure ($P_o$) has a predetermined and predictable relation to the control pressure ($P_c$). Past practice has been to position a machined pickoff a predetermined distance from the exit passage in the amplifier. It was difficult to bond a machined pickoff to the vortex body so as to accurately align and space the pickoff and the exit hole, and it was also difficult and expensive to machine the pickoff so that the hole therein was of accurate and uniform size.

SUMMARY OF THE INVENTION

In this invetnion, the vortex body is of a laminated construction and one of the lamina in the body constitutes the pickoff. This lamina, which is in the form of a flat plate or sheet, is readily formed with an accurately located and sized pickoff orifice by etching and/or drilling or the like. Furthermore, precise and accurate spacing of the pickoff orifice from the vortex chamber exit passage is obtained since this spacing is determined by the thickness of the lamina or laminae disposed therebetween and in which the amplifier vent passage is formed. As a result, the vortex amplifier of this invention can be manufactured at reasonable cost and will provide a predetermined and predictable relationship between $P_o$ and $P_c$ without objectionable oscillation of $P_o$.

It is an object of this invention, therefore, to provide an improved vortex amplifier.

Figure 1:
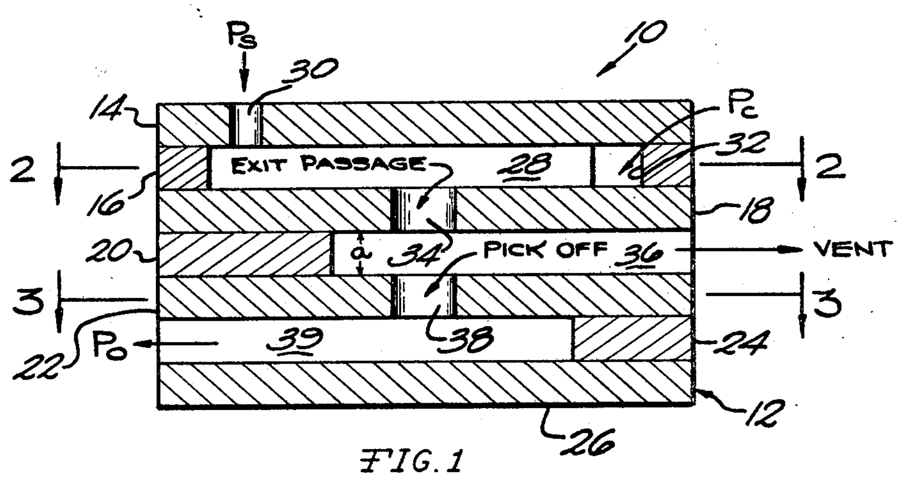

Further objects, features and advantages of this invention will become apparent from a consideration of the following description, the appended claims, and the accompanying drawing in which:

FIGURE 1 is a transverse sectional view of the amplifier of this invention; and

Figure 2:
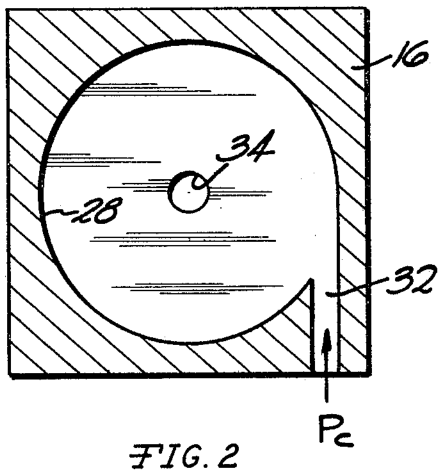
Figure 3:
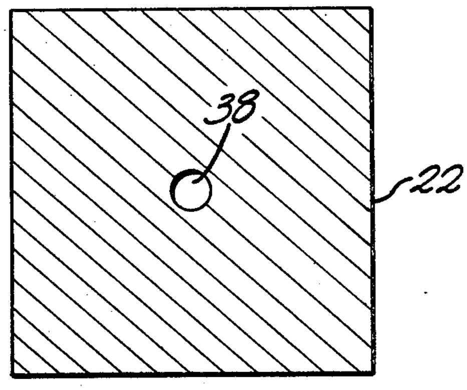
Figure 1:
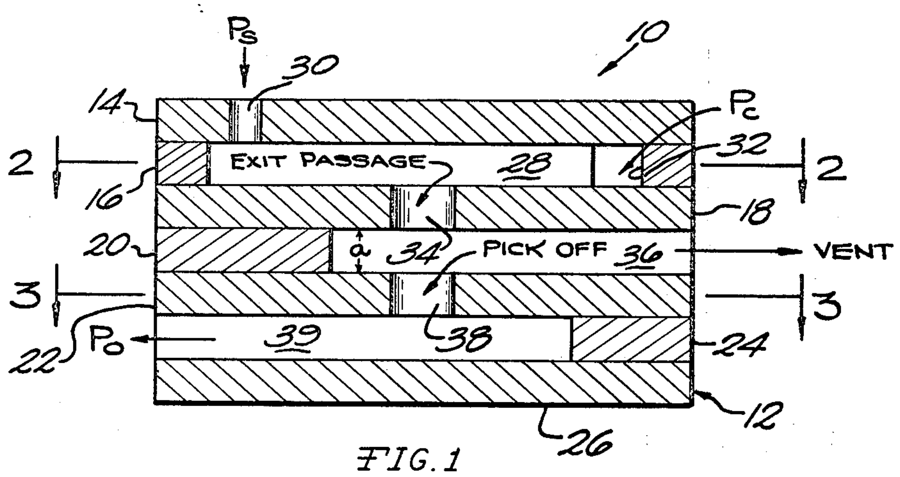
Figure 2:
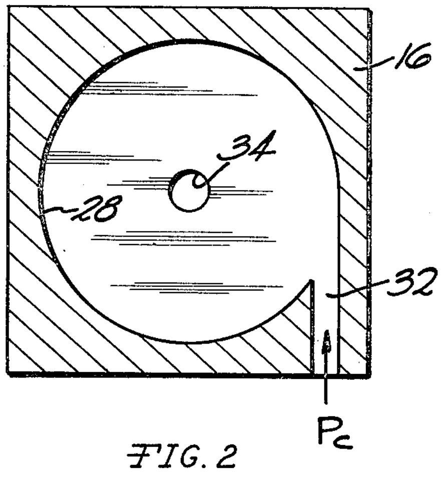
Figure 3:
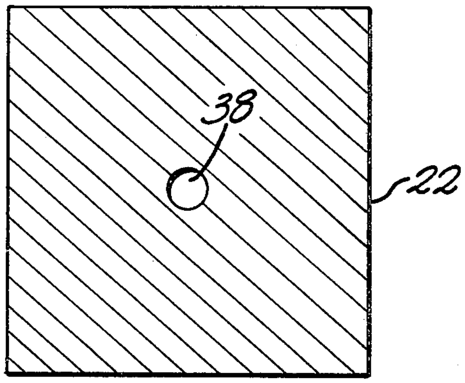

FIGURES 2 and 3 are reduced sectional views of the amplifier of this invention as seen from substantially the lines 2—2 and 3—3 in FIG. 1.

With reference to the drawing, the vortex fluid amplifier of this invention, indicated generally at 10, is illustrated in FIG. 1 as consisting of a laminated body 12. A plurality of flat laminae 14–26, inclusive, are positioned in surface-to-surface engagement and secured together so as to constitute the integral whole body 12. As shown in FIG. 1, the laminae 14, 16 and 18 cooperate to form a cylindrical vortex chamber 28 having an inlet 30 for supply fluid at pressure $P_s$, an inlet 32 for control fluid at pressure $P_c$, and an exit passage 34 disposed centrally of the lamina 18 and substantially axially of the chamber 28.

The lamina 20 which is secured to lamina 18, is formed with a vent passage 36. In the illustrated embodiment of the invention, the lamina 22 in which the pickoff orifice 38 is formed is secured directly to the vent passage lamina 20 so that the pickoff orifice 38 is aligned with the exit passage 34 and spaced therefrom by a distance *a*. This distance *a* is the predetermined distance required in the design of each specific vortex amplifier 10 and is readily obtained in the structure of this invention by forming either the lamina 20 of a thickness *a* or by forming a plurality of laminae of a combined thickness *a* and using these laminae in place of the lamina 20. The orifice 38 is readily formed of the desired precise size, such as by drilling or the like, since the flat sheet lamina 22 can be easily held in a fixed position, and the orifice 38 is readily aligned with the exit passage 34 during assembly of the lamina 22 with the other body laminae.

The lamina 24 which is secured to the pickoff lamina 22 is formed with a discharge passage 39 for output fluid at pressure $P_o$, and a cover lamina 26 is secured to the lamina 24.

In the operation of the vortex amplifier 10, supply fluid at pressure $P_s$ is supplied to the vortex chamber 28 through the inlet passage 30 in the cover lamina 14. Control fluid at pressure $P_c$ is supplied to the chamber 28 through a tangential inlet 32 so that fluid will issue from the exit passage 34 in a cone shape configuration, with the magnitude of divergence of the fluid in the cone being determined by the magnitude of $P_c$. Thus, as $P_c$ is increased, the amount of fluid directed through pickoff orifice 38 is decreased so that $P_o$ is correspondingly decreased. The result is a readily manufacturable structure in which the output pressure $P_o$ has a predictable and predetermined relationship to the control pressure $P_c$.

Having thus described an embodiment of this invention, what is claimed is:

1. A vortex fluid amplifier comprising a plurality of flat laminae positioned in surface-to-surface engagement and secured together so as to constitute an integral whole body having a cylindrical vortex chamber provided with an inlet for supply fluid, an inlet for control fluid extending substantially tangentially of said chamber, and an exit passage extending substantially axially of said chamber, one of said body laminae having a pickoff orifice formed therein, said pickoff being positioned a distance downstream from said exit passage and disposed in an aligned relation with said exit passage.

2. A vortex fluid amplifier according to claim 1 wherein at least one of said body laminae is disposed between said lamina with the pickoff orifice therein and said exit passage, the thickness of said at least one lamina thereby determining the magnitude of said distance.

3. A vortex fluid amplifier according to claim 2 wherein said at least one lamina is formed with a vent passage which is disposed between said exit passage and said pickoff orifice.

4. A fluid vortex device comprising a plurality of flat lamina positioned in surface-to-surface engagement and secured together so as to constitute an integral whole body having a cylindrical vortex chamber provided with an inlet supply for fluid, means for imparting a control rotational velocity to said supply fluid in said vortex chamber, and an exit passageway extending substantially axially from said chamber, one of said body lamina having a pickoff orifice formed therein, said pickoff orifice being positioned a distance downstream from said exit passage to provide a signal having signal variations corresponding in amplified manner to variations in said rotational velocity in said vortex chamber, said pickoff orifice also being disposed in an aligned relation with said exit passage.

References Cited

UNITED STATES PATENTS

| | | | |
|---|---|---|---|
| 3,351,080 | 11/1967 | Datwyler et al. | 137—81.5 |
| 3,267,946 | 8/1966 | Adams et al. | 137—81.5 |
| 3,366,370 | 1/1968 | Rupert | 137—81.5 X |
| 3,373,759 | 3/1968 | Adams | 137—81.5 |

M. CARY NELSON, Primary Examiner

W. R. CLINE, Assistant Examiner